United States Patent
Lan et al.

(10) Patent No.: US 8,600,377 B2
(45) Date of Patent: Dec. 3, 2013

(54) DISTRIBUTED HLR SYSTEM AND METHOD FOR OBTAINING ROAMING NUMBER OF CALLEE

(75) Inventors: Sizhong Lan, Beijing (CN); Yuyi Zhao, Beijing (CN); Shuaiyu Wang, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 713 days.

(21) Appl. No.: 12/636,335

(22) Filed: Dec. 11, 2009

(65) Prior Publication Data
US 2010/0151856 A1    Jun. 17, 2010

(30) Foreign Application Priority Data
Dec. 12, 2008   (CN) .......................... 2008 1 0239534

(51) Int. Cl.
*H04W 4/00*   (2009.01)
(52) U.S. Cl.
USPC ........................ 455/433; 455/432.1; 455/445
(58) Field of Classification Search
USPC ........ 455/414.1, 415, 422.1, 432.1, 433, 445, 455/461
See application file for complete search history.

(56) References Cited

U.S. PATENT DOCUMENTS

| | | | |
|---|---|---|---|
| 5,991,621 A * | 11/1999 | Alperovich | 455/433 |
| 6,101,382 A * | 8/2000 | Granberg | 455/414.1 |
| 7,522,632 B2 * | 4/2009 | La Porta et al. | 370/466 |
| 8,131,265 B2 * | 3/2012 | Cheng et al. | 455/412.2 |
| 2003/0114197 A1 * | 6/2003 | Stine et al. | 455/564 |
| 2004/0242225 A1 * | 12/2004 | Wang | 455/432.1 |
| 2006/0276226 A1 * | 12/2006 | Jiang | 455/558 |
| 2008/0039104 A1 * | 2/2008 | Gu et al. | 455/445 |
| 2008/0167018 A1 * | 7/2008 | Havlark et al. | 455/414.2 |

* cited by examiner

*Primary Examiner* — Michael Faragalla
*Assistant Examiner* — Gerald Oliver
(74) *Attorney, Agent, or Firm* — Nixon Peabody LLP

(57) ABSTRACT

The present invention relates to the technical field of communications, and in particular, to the technology of obtaining a roaming number of a callee based on an HLR system and fetching the roaming number of the callee from a visited MSC. The invention provides a distributed HLR system and a method for obtaining a roaming number of a callee, the method includes: determining, by a user database device of a distributed HLR system, an HLR front end corresponding to an identification number according to the corresponding relationship information after obtaining the identification number of a callee from a received SRI request message, sending a PRN request message of the callee via the determined HLR front end, and obtaining a roaming number of the callee from a returned PRN response message. After a user database device of a distributed HLR system receives an SRI request message, an HLR front end on which an MAP process of the callee takes place is taken as the exit of the PRN request message, so that the path through which the PRN request message reaches the MSC on which the callee registers may be shortened, the network resources may be saved, and the time delay of a service may be reduced.

9 Claims, 3 Drawing Sheets

DISTRIBUTED HLR SYSTEM AND METHOD FOR OBTAINING ROAMING NUMBER OF CALLEE

CROSS-REFERENCE TO RELATED APPLICATIONS

This application claims the benefit of priority under 35 U.S.C. 119 and 37 C.F.R. 1.55 to Chinese Patent Application Serial No. 200810239534.4, filed Dec. 12, 2008, which is incorporated herein by reference in its entirety.

FIELD OF THE INVENTION

The present invention relates to the technical field of communications, and in particular, to the technology of obtaining a roaming number of a callee based on a distributed Home Location Register (HLR) system and fetching the roaming number of the callee from a visited Mobile Switching Center (MSC).

BACKGROUND OF THE INVENTION

In a communication network, data such as user subscription information, authentication information and dynamic information (for example, home location) is stored in an HLR. With the continuous development of networks and services, the HLR evolves to a user data storage network with a large capacity, a distributed mode, high reliability, a separated architecture, a uniform data model and an open interface. Therefore, the HLR no longer presents in the physical form of a single system; instead, it presents as a network having a layered architecture with different functions, which is referred to as "distributed HLR system" in the industry.

As shown in FIG. 1, a distributed HLR system may be consisted of a plurality of user database devices and a plurality of HLR front ends. Where, the user database devices are used to store user data, and the HLR front ends are used to accomplish the conversion from an Mobile Application Part (MAP) Protocol to an Internal Standard Protocol. In order to improve the overall reliability of the system, a service system, such as MSC, Serving GPRS Support Node (SGSN) and Service Control Point (SCP), interacts with an HLR front end, and the HLR front end interacts with a user database device; a plurality of user database devices in a distributed HLR system store the same user data and synchronize the user data in real time so as to improve the security of the data; a plurality of devices in the distributed HLR system may be geographically widely deployed based on the IP bearer, so that they have the geographic disaster recovery capability.

At present, in a mobile communication network, a distributed HLR system employs the application mode as shown in FIG. 2. A distributed HLR system provides services to users in a plurality of signaling areas; in each signaling area, an HLR front end of the distributed HLR system is set proximately with a Signaling Transfer Point (STP) device and an MSC to reduce the link construction; the STP in each signaling area is responsible for routing an MAP signaling between different signaling areas according to the number range.

In the above application mode, it is hypothesized that a user A with the number of 1390011001 in a signaling area 1 calls a user B with the number of 1390012001 in a signaling area 2 via an MSC 1, the procedure of fetching a roaming number of a callee from a visited MSC is as shown in FIG. 3, which includes the following processes.

S301: The MSC 1 initiates an MAP request message for Send Routing Information (SRI) via a proximate HLR front end (for example, an HLR front end A).

S302: A user database device initiates an MAP operating process for Provide Roaming Number (PRN) via the HLR front end A according to a registration MSC number of the user B (which is MSC 2 herein).

S303: The HLR front end A generally selects a proximate STP 1 for the routing of a PRN request message to the MSC 2.

S304: The MSC 2 returns the roaming number of the user B in a PRN response message after receiving the PRN request message (no matter whether the user B registers in an MSC of the home network or registers in an MSC of the roaming network, the network allocates a roaming number to the user B).

The PRN response message reaches the user database device via the STP 2, the STP 1 and the HLR front end A.

S305: The user database device feeds back the roaming number of the user B to the MSC 1 via an SRI response message.

S306: The MSC 1 initiates to the MSC 2 a call to the user B according to the roaming number of the user B.

It can be seen from the above procedure that, in the prior art, when fetching the roaming number of the callee from the visited MSC (i.e., determining the routing of the callee according to the roaming number of the callee), the distributed HLR system selects the HLR front end that functions as the entrance of the SRI request message as the exit of the PRN request message. The inventors of the present invention find that, in such a method for fetching the roaming number of the callee from the visited MSC, the routing of the PRN message is circuitous, which increases the load of the STP interfaces and links of the signaling network, thus wasting the network resources and bringing larger time delay of a service.

SUMMARY OF THE INVENTION

The embodiments of the invention provide a distributed HLR system and a user database device thereof, and a method and a system for obtaining a roaming number of a callee, thereby saving the network resources and reducing the time delay of a service during the process of obtaining the roaming number of the callee.

A method for obtaining a roaming number of a callee according to an embodiment of the invention, including:

obtaining, by a user database device of a distributed HLR system, an identification number of a callee from a received SRI request message;

determining an HLR front end corresponding to the identification number according to corresponding relationship information in which the corresponding relationship between an identification number of a callee and an identification of an HLR front end on which an MAP process of the callee takes place is recorded; and sending, by the user database device, a PRN request message of the callee via the determined HLR front end, and obtaining the roaming number of the callee from a returned PRN response message.

The process of obtaining the corresponding relationship includes:

obtaining, by the user database device, the identification number of the callee and the identification of the HLR front end on which the MAP process takes place, during the MAP process of the callee before receiving the SRI request message; and taking the obtained corresponding relationship between the identification number and the identification of the HLR front end as the corresponding relationship.

After obtaining the roaming number of the callee by the user database device, the method further includes:

returning, by the user database device, the obtained roaming number to an MSC sending the SRI request message.

A user database device according to an embodiment of the invention, including:

a request message receiving module, adapted to receive an SRI request message;

an identification number of callee obtaining module, adapted to obtain an identification number of a callee from the SRI request message;

a corresponding relationship information storage module, adapted to store corresponding relationship information in which the corresponding relationship between an identification number of a callee and an identification of an HLR front end on which an MAP process of the callee takes place is recorded;

a front end determining module, adapted to determine an HLR front end corresponding to the identification number according to the identification number of the callee and the corresponding relationship information;

a request message sending module, adapted to send a PRN request message of the callee via the HLR front end determined by the front end determining module; and a roaming number obtaining module, adapted to receive a PRN response message returned and obtain a roaming number of the callee from the PRN response message.

A distributed HLR system including an HLR front end according to an embodiment of the invention, further including:

a user database device, adapted to determine an HLR front end corresponding to an identification number according to corresponding relationship information, in which the corresponding relationship between an identification number of a callee and an identification of an HLR front end on which an MAP process of the callee takes place is recorded, after obtaining the identification number of a callee from a received SRI request message, send a PRN request message of the callee via the determined HLR front end, and obtain a roaming number of the callee from a returned PRN response message.

A system for obtaining a roaming number of a callee, including:

a first MSC, adapted to send an SRI request message;

a distributed HLR system, of which a user database device receives the SRI request message via a first HLR front end of the distributed HLR system, determines the corresponding HLR front end according to an identification number of a callee obtained from the SRI request message and the corresponding relationship information, and sends a PRN request message of the callee via the corresponding HLR front end; and a second MSC, adapted to return a PRN response message after receiving the PRN request message;

where the user database device of the distributed HLR system obtains a roaming number of the callee from the returned PRN response message.

In the embodiments of the invention, after a user database device of a distributed HLR system receives an SRI request message, a PRN request message is not sent from an HLR front end receiving the SRI request message; instead, an HLR front end on which an MAP process of the callee takes place is found and taken as the exit of the PRN request message, so that the path through which the PRN request message reaches the MSC on which the callee registers may be shortened, the network resources may be saved, and the time delay of a service may be reduced.

DETAILED DESCRIPTION OF THE EMBODIMENTS

The inventors of the present invention find that the path nodes through which the PRN message routing passes may be reduced if taking the HLR front end in the signaling area in which the callee exists as the exit of the PRN request message, so that the network resources may be saved and the time delay of a service may be reduced. The specific technical solutions of the embodiments of the invention will now be illustrated in conjunction with the drawings.

During an MAP process in which a mobile terminal performs the location update, calling or authentication, the corresponding functions need to be accomplished via the HLR front end in the signaling area in which the mobile terminal exists interacts with the user database device; thus, the user database device can know on which HLR front end the last MAP process of the mobile terminal takes place. If the user database device correspondingly records the number of the mobile terminal (for example, the MSISDN number of the mobile terminal) and the identification of the HLR front end on which the latest MAP process of the mobile terminal takes place, when the mobile terminal is called, the user database device can find the HLR front end on which the latest MAP process of the mobile terminal takes place according to the recorded corresponding relationship, and take the HLR front end as the exit of the PRN request message. Thus, the path nodes through which the PRN request message passes may be reduced greatly, so that the network resources may be saved and the time delay of a service may be reduced.

Figure 1:
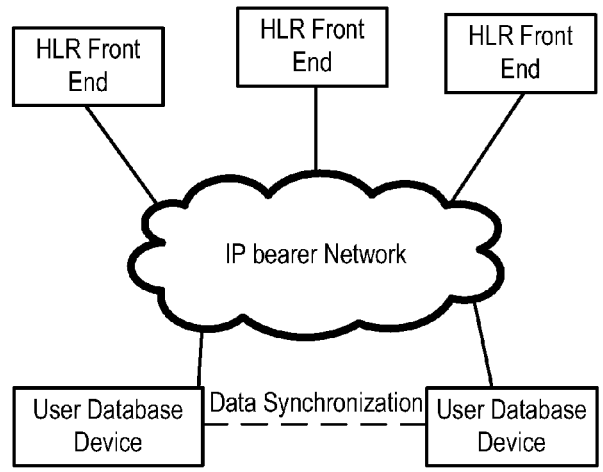
FIG. 1 is a schematic diagram of a distributed HLR system in the prior art.
Figure 2:
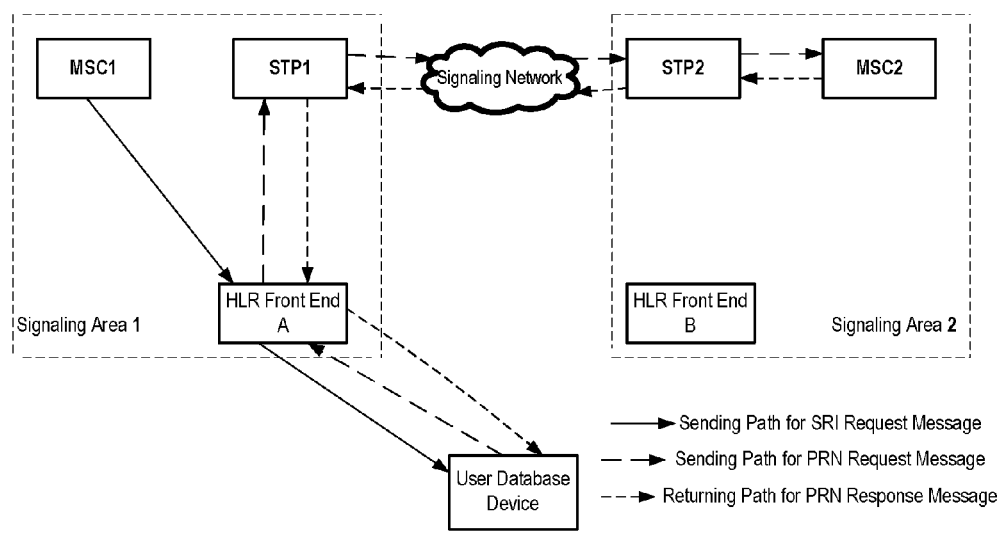
FIG. 2 is a schematic diagram showing the application of a distributed HLR system in a mobile communication network in the prior art.
Figure 3:
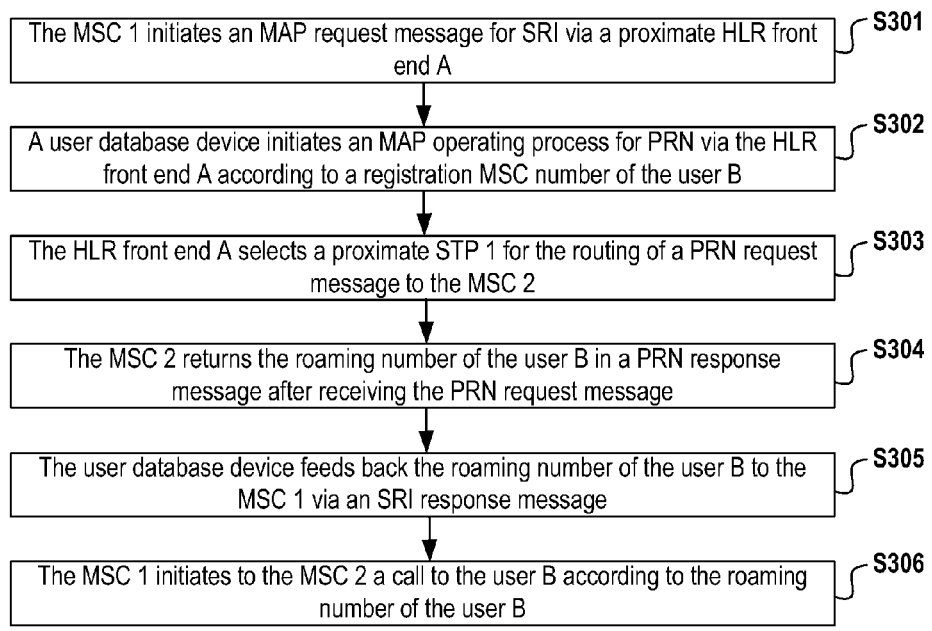
FIG. 3 is a flow chart of a method for fetching a roaming number of a callee from a visited MSC in the prior art.
Figure 4:
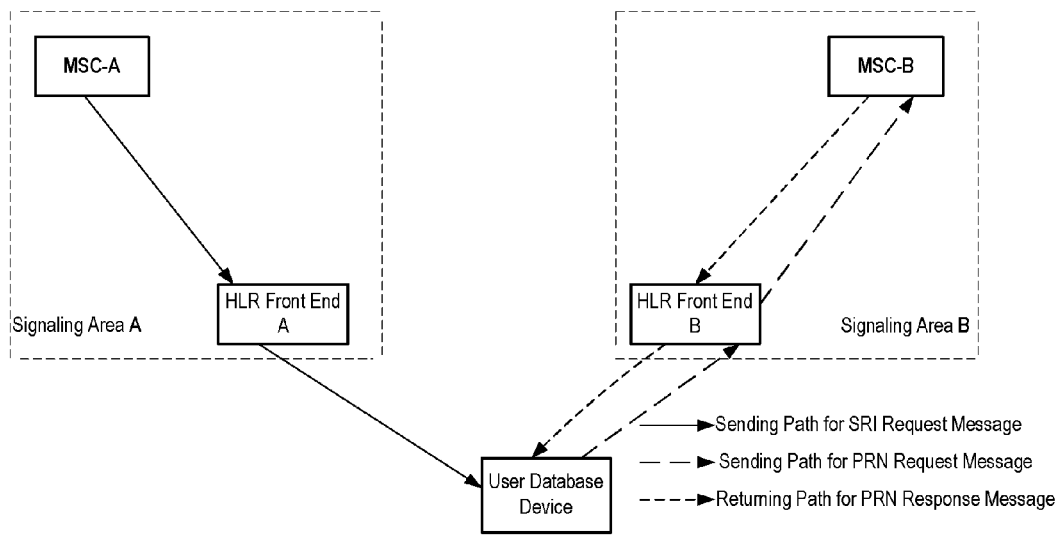
FIG. 4 is a schematic diagram showing the application of a distributed HLR system in a mobile communication network according to an embodiment of the invention.
Figure 5:
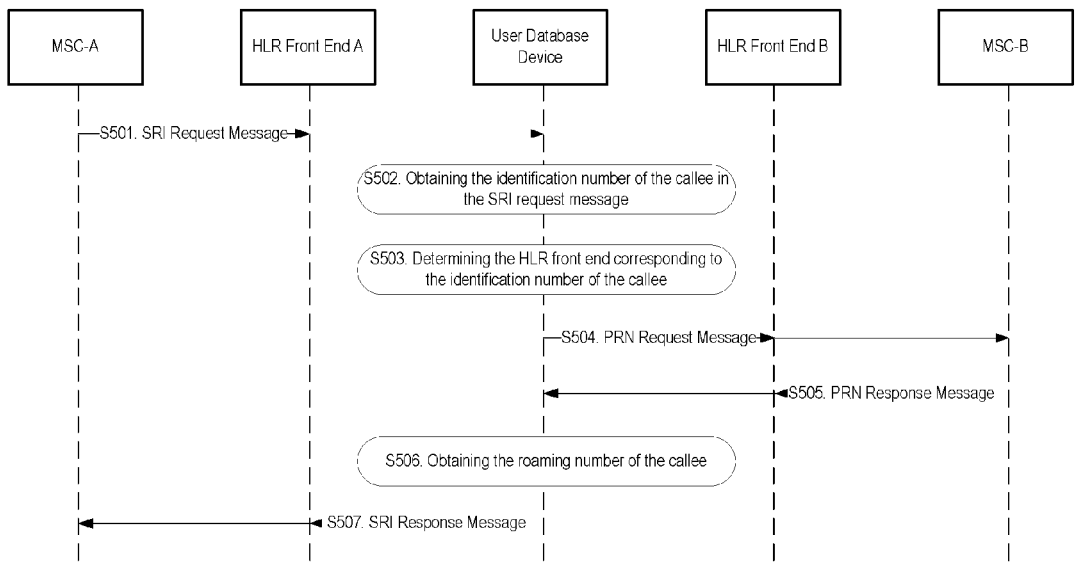
FIG. 5 is a flow chart of a method for fetching a roaming number of a callee from a visited MSC according to an embodiment of the invention.

The specific solution will be described now by taking the situation shown in FIG. 4 in which a mobile terminal A in a signaling area A calls a mobile terminal B in a signaling area B as an example. The procedure of obtaining the roaming number of the mobile terminal B that is called and fetching the roaming number of the mobile terminal B from a visited MSC is shown in FIG. 5, which includes the following processes.

S501: An MSC-A in the signaling cell in which the mobile terminal A exists initiates an SRI request message via a proximate HLR front end A when the mobile terminal A calls the mobile terminal B.

S502: A user database device of a distributed HLR system obtains the identification number of the callee in the SRI request message, where the identification number of the callee may be the MSISDN (Mobile Station Integrated Services Digital Network) number of the callee.

S503: The user database device determines an HLR front end corresponding to the identification number of the callee according to corresponding relationship information.

The corresponding relationship between the identification number of a mobile terminal and the identification of the HLR front end on which the MAP process of the mobile terminal takes place is recorded in the corresponding relationship of the user database device. The user database device looks up the corresponding relationship between the identification number of the callee and the identification of the HLR front end on which the MAP process of the called mobile terminal takes place in the corresponding relationship information, and determines the HLR front end corresponding to the identification number of the callee.

The process in which the user database device records the identification number of a mobile terminal and the identification of the HLR front end on which the MAP process of the mobile terminal takes place is as follows: during a process in which a mobile terminal performs the location update, calling or authentication, the MAP process needs to be accomplished by an MSC via a proximate HLR front end interacts with a user database device, the user database device may record the identification number of the mobile terminal and the identification of the HLR front end on which the MAP process takes place into the corresponding relationship information correspondingly; if the location of the mobile terminal changes, and if the HLR front end on which the MAP process takes place changes when the mobile terminal performs the next location update, the user database device again records the identification number of the mobile terminal and the identification of the HLR front end, on which the current MAP process takes place, to replace the corresponding relationship between the identification number of the mobile terminal and the identification of the HLR front end recorded last time. Thus, the corresponding relationship between the identification number of the mobile terminal and the identification of the HLR front end on which the latest MAP process of the mobile terminal takes place is maintained in the user database device. Since the user database device records the corresponding relationship between the identification number of the called mobile terminal B and the identification of the HLR front end on which the latest MAP process of the mobile terminal B takes place into the corresponding relationship information before the MSC-A initiates the SRI request message, the user database device may find the HLR front end on which the latest MAP process of the mobile terminal takes place according to the corresponding relationship information. For example, Table 1 shows a corresponding relationship table maintained in the user database device.

TABLE 1

| Identification Number Of Mobile Terminal | Identification Of HLR Front End |
|---|---|
| 1390012001 | HLR front end-2 |
| 1390012002 | HLR front end-5 |
| 1390012003 | HLR front end-2 |
| 1390012004 | HLR front end-6 |
| 1390012005 | HLR front end-3 |
| ... | ... |

S504: The user database device sends a PRN request message via the HLR front end determined (HLR front end B).

The user database device takes the HLR front end B as the exit of the PRN request message, and sends the PRN request message to the MSC (MSC-B) on which the identification number of the callee is registered. Thus, the PRN request message no longer needs to pass by the HLR front end A and the STP-A; instead, it is sent from the HLR front end on which the latest MAP process of the called mobile terminal B takes place, thereby the path nodes through which the signaling passes may be reduced, the network resources may be saved, and the time delay of a service may be reduced.

S505: The MSC-B return a PRN response message via the HLR front end B after receiving the PRN request message.

S506: The user database device obtains the roaming number of the callee after receiving the PRN response message.

S507: the user database device sends a SRI response message carrying the roaming number of the callee to the MSC-A via the HLR front end A, thereby accomplishing the procedure of fetching the roaming number of the callee from the visited MSC via the MSC-A.

It should be understood by those skilled in the art that, in the above illustration, although the processes of the method are described sequentially for easy understanding, the sequence of the above processes should not be strictly limited.

Figure 6:
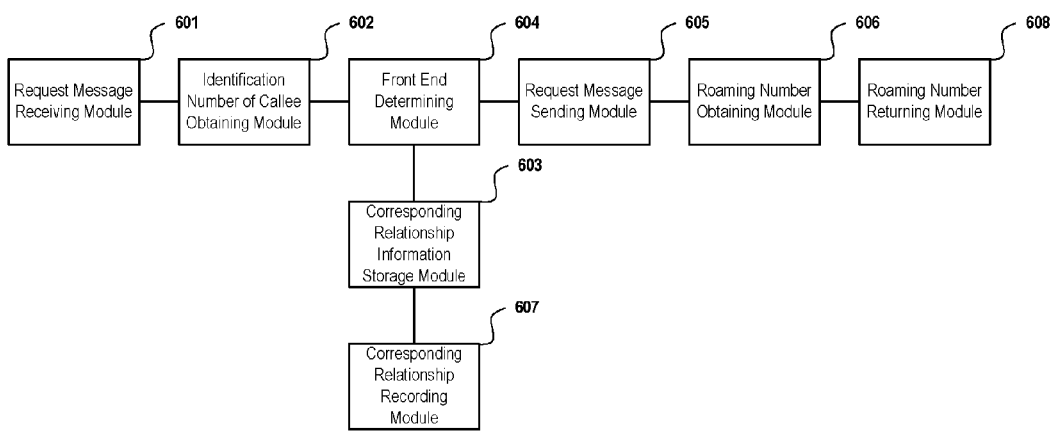
FIG. 6 is a block diagram showing the structure of a user database device according to an embodiment of the invention.

An embodiment of the invention provides a distributed HLR system, which includes an HLR front end and a user database device, where one structure of the user database device may be as shown in FIG. 6. The user database device includes: a request message receiving module 601, an identification number of callee obtaining module 602, a corresponding relationship information storage module 603, a front end determining module 604, a request message sending module 605 and a roaming number obtaining module 606.

The request message receiving module 601 is adapted to receive an SRI request message.

The identification number of callee obtaining module 602 is adapted to obtain the identification number of a callee from the SRI request message received by the request message receiving module 601.

The corresponding relationship information storage module 603 is adapted to store corresponding relationship information in which the corresponding relationship between the identification number of a callee and the identification of the HLR front end on which the MAP process of the callee takes place is recorded.

The front end determining module 604 is adapted to look up the corresponding relationship information stored by the corresponding relationship information storage module 603 according to the identification number obtained by the identification number of callee obtaining module 602 to determine the HLR front end corresponding to the identification number.

The request message sending module 605 is adapted to send a PRN request message of the callee via the HLR front end determined by the front end determining module 604.

The roaming number obtaining module 606 is adapted to receive a PRN response message returned, and obtain the roaming number of the callee from the PRN response message.

Moreover, the user database device includes:

a corresponding relationship recording module 607, adapted to obtain the identification number of the callee and the identification of the HLR front end on which an MAP process takes place during the MAP process of the callee, and record the obtained corresponding relationship between the identification number and the identification of the HLR front end into the corresponding relationship information.

The user database device further includes:

a roaming number returning module 608, adapted to return the roaming number obtained by the roaming number obtaining module 606 to the MSC sending the SRI request message.

In the embodiments of the invention, after a user database device of a distributed HLR system receives an SRI request message, a PRN request message is not sent from an HLR front end receiving the SRI request message; instead, an HLR front end on which an MAP process of the callee takes place is found and taken as the exit of the PRN request message, so that the path through which the PRN request message reaches the MSC on which the callee registers may be shortened, the network resources may be saved, and the time delay of a service may be reduced.

It may be understood by those skilled in the art that, all or a part of the processes in the method according to the above embodiment may be implemented by instructing related hardware via a program, and the program may be stored in a computer-readable storage medium, for example, a ROM/RAM, a magnetic disc and a compact disc.

Moreover, it should be understood that the apparatus structures shown in the drawings or the embodiments are illustrative only and represent logical structure. Where, the modules displayed as separated components may be or may be not physically separated, and the components displayed as modules may be or may be not physical modules.

It will be appreciated that one skilled in the art may make various modifications and alterations to the present invention without departing from the spirit and scope of the present invention. Accordingly, if these modifications and alterations to the present invention fall within the scope of the claims of the present invention and their equivalents, the present invention intends to include all these modifications and alterations.

The invention claimed is:

1. A method for obtaining a roaming number of a callee, comprising:
   obtaining, by a user database device of a distributed Home Location Register HLR system, an identification number of a callee carried in a received Send Routing Information SRI request message, wherein the SRI request message is transmitted to the user database device via an HLR front end in a signaling area in which a caller exists;
   determining an HLR front end corresponding to the identification number according to corresponding relationship information in which the corresponding relationship between an identification number of a callee and an identification of an HLR front end on which a latest Mobile Application Part MAP process of the callee takes place is recorded, wherein the HLR front end on which the latest MAP process of the callee takes place is an HLR front end in a signaling area in which the callee currently exists; and
   sending, by the user database device, a Provide Roaming Number PRN request message of the callee via the determined HLR front end, and obtaining the roaming number of the callee from a returned PRN response message.

2. The method of claim 1, wherein, the process of obtaining the corresponding relationship comprises:
   obtaining, by the user database device, the identification number of the callee and the identification of the HLR front end on which the latest MAP process takes place, during the latest MAP process of the callee before receiving the SRI request message; and
   taking the obtained corresponding relationship between the identification number and the identification of the HLR front end as the corresponding relationship.

3. The method of claim 1, wherein, after obtaining the roaming number of the callee by the user database device, the method further comprises:
   returning, by the user database device, the obtained roaming number to a Mobile Switching Center MSC sending the SRI request message.

4. The method of claim 1, wherein, the identification number of the callee is a Mobile Station Integrated Services Digital Network MSISDN number of the callee.

5. A user database device, comprising:
   a request message receiving module, adapted to receive an SRI request message, wherein the SRI request message is transmitted to the request message receiving module via an HLR front end in a signaling area in which a caller exists;
   an identification number of callee obtaining module, adapted to obtain an identification number of a callee carried in the SRI request message;
   a corresponding relationship information storage module, adapted to store corresponding relationship information in which the corresponding relationship between an identification number of a callee and an identification of an HLR front end on which a latest MAP process of the callee takes place is recorded, wherein the HLR front end on which the latest MAP process of the callee takes place is an HLR front end in a signaling area in which the callee currently exists;
   a front end determining module, adapted to determine an HLR front end corresponding to the identification number according to the identification number of the callee and the corresponding relationship information;
   a request message sending module, adapted to send a PRN request message of the callee via the HLR front end determined by the front end determining module; and
   a roaming number obtaining module, adapted to receive a PRN response message returned and obtain a roaming number of the callee from the PRN response message.

6. The device of claim 5, further comprising:
   a corresponding relationship recording module, adapted to obtain the identification number of the callee and the identification of the HLR front end on which the latest MAP process takes place during the latest MAP process of the callee, and record the obtained corresponding relationship between the identification number and the identification of the HLR front end into the corresponding relationship information.

7. The device of claim 5, further comprising:
   a roaming number returning module, adapted to return the roaming number obtained by the roaming number obtaining module to the MSC sending the SRI request message.

8. A distributed HLR system comprising HLR front ends, wherein, the system further comprises:
   a user database device, adapted to determine an HLR front end corresponding to an identification number of a callee according to corresponding relationship information, in which the corresponding relationship between an identification number of the callee and an identification of an HLR front end on which a latest MAP process of the callee takes place is recorded, after obtaining the identification number of the callee carried in a received SRI request message, send a PRN request message of the callee via the determined HLR front end, and obtain a roaming number of the callee from a returned PRN response message, wherein the SRI request message is transmitted to the user database device via an HLR front end in a signaling area in which a caller exists; and the HLR front end on which the latest MAP process of the callee takes place is an HLR front end in a signaling area in which the callee currently exists.

9. The system of claim 8, wherein, the user database device is further adapted to obtain the identification number of the callee and the identification of the HLR front end on which the latest MAP process takes place during the latest MAP process of the callee, and record the obtained corresponding relationship between the identification number and the identification of the HLR front end into the corresponding relationship information.

* * * * *